Dec. 30, 1969 D. J. WALLDORF 3,486,257

IDENTIFICATION TAG

Filed Feb. 15, 1968

INVENTOR.
DIANN J. WALLDORF
BY David Teschner
ATTORNEY

United States Patent Office 3,486,257
Patented Dec. 30, 1969

3,486,257
IDENTIFICATION TAG

Diann J. Walldorf, Somerset, N.J., assignor to Thomas & Betts Corporation, Elizabeth, N.J., a corporation of New Jersey Filed Feb. 15, 1968, Ser. No. 705,790
Int. Cl. G09f *3/00, 3/08*
U.S. Cl. 40—2 9 Claims

ABSTRACT OF THE DISCLOSURE

The invention is directed to an identification tag to be placed about one or more objects to be labeled or identified. The identification tag is arranged as a two part, fold-over tag whereby indicia placed upon a first part would be protected from its surrounding environment by the application of the second portion of the tag thereover. In a first embodiment, the indicia is placed upon a writing surface by means of pen, pencil or similar manual instruments or by means of such automatic instruments such as a typewriter. A protective release paper is then removed from the second portion of the tag base layer to expose a layer of transparent pressure sensitive adhesive and folded over atop the indicia receiving surface to form a sealed tag which is protected from its surrounding environment. In a second embodiment of the identification tag, the tag base layer is prepared for the receipt of indicia which may be written or printed thereon by manual means and permits a second portion of the tag base layer to be folded over to seal the indicia from the surrounding environment. In each of the embodiments, the tag is provided with mounting slots to receive straps so that the identification tag may be securely affixed to the articles to be identified.

BACKGROUND OF THE INVENTION

Field of the invention

The invention is directed to the field of identifying or marking individual articles or a plurality of articles. The identification tag, of the type described, finds particular utility in identifying individual conductors or conductor bundles used for electrical or electronic purposes. Such an identification tag could similarly be employed to mark lengths of tubing, piping, hose, tools or the like.

Description of the prior art

Identification tags, available in the prior art, intended to protect indicia placed thereon from the environment in which they were placed, generally required use of two sheets of transparent sealable material with the insertion therebetween of an indicia bearing record such as a piece of paper or the like. Once the indicia bearing record had been placed between the two sheets of transparent material, the edges around the record were sealed by means of heat sealing, sonic welding, adhesives, crimping or the like. Such devices required that ancillary equipment be carried along in order to use the identification tag. For example, it was necessary to carry the sealing device whether it be a heat sealing device, a sonic welding device, or the like. In addition, the protective layers of the tag and the indicia receiving record were separate and care had to be taken to see that there were as many indicia receiving records as there were pairs of protective layers. When such identification tags were to be used for the identification of individual conductors or a plurality of conductors, it would have to be taped or otherwise tied to the conductor or a plurality of conductors. The application of tape, or lashing devices, partially occluded the information on the identification tag. The use of tape, although general was poor because any environmental effect upon the adhesive could cause the loss of the identification tag or at least its removal from the articles to be identified.

SUMMARY OF THE INVENTION

The present invention obviates all of the problems encountered with respect to prior art identification tag devices and provides a simple to use identification tag with all the elements necessary for providing an indicia bearing record and for sealing the identification tag against its environment provided in a single unit. In addition, the identification tag is provided with mounting slots to receive therethrough mounting devices such as straps to fixedly mount the identification tag to the articles to be identified preventing either the loss of the identification tag itself or the loss of the entire identification assembly. This result is achieved by the use of an identification tag base layer of a transparent material having a first face thereof roughed to receive an adhesive or to receive indicia to be written directly upon the tag base layer. In a first embodiment of the device the entire first face, or roughened first face of the tag base layer is covered with a transparent pressure sensitive adhesive material. Over this adhesive material is placed a layer which has on one surface thereof a release-coating and on the other surface, an indicia receiving surface. At approximately the midpoint of the tag the combined released layer and indicia receiving surface is slit to permit removal of one-half of the release-coated indicia receiving material. Once a message, or other indicia have been placed upon the indicia receiving surface of one of the halves, the release-coated indicia receiving material of the other half is removed and the base layer folded over the indicia receiving surface whereby a sealed indentification tag is achieved. In a second embodiment, indicia is written directly upon the exposed roughened first surface of the base layer, A release-coated material which covers the pressure sensitive adhesive, applied only to one-half of the tag base layer surface may then be removed and the tag folded about same prescored center line so as to form a sealed identification tag protected from the environment. In all embodiments, mounting slots are placed at intervals along the identification tag for the receipt therethrough of straps which will serve not only to hold the identification tag to the articles to be identified but also serve to retain the tag in its assembled condition. The tags may be prepared in discrete individual units or may be prepared in continuous webs and cut according to the requirements of the particular application. It is therefore an object of this invention to provide an identification tag which is simple to use and which is constructed in such a manner as to provide all the basic components of the identification tag within a single unit.

It is another object of this invention to provide an improved form of identification tag suitable for protecting indicia placed thereon from its surrounding environment.

It is yet another object of this invention to provide an improved identification tag having an indicia receiving record capable of receiving indicia produced by manual or automatic means.

It is still another object of this invention to provide an environmentally sealed identification tag where an indicia to be placed thereon is placed directly on the material of the tag omitting the requirement for additional indicia bearing records.

It is still another object of this invention to provide an improved identification tag having mounting slots therein to receive mounting straps and thus assuring the secure mounting of the identification tag to the articles to be identified.

Other objects and features of the invention will be pointed out in the following description and claims and illustrated in the accompanying drawings, which disclose, by way of example, the principles of the invention and the best modes which have been contemplated for carrying them out.

BRIEF DESCRIPTION OF THE DRAWINGS

Similar elements are given similar reference characters in each of the respective figures.

DESCRIPTION OF THE PREFERRED EMBODIMENTS

Figure 1:
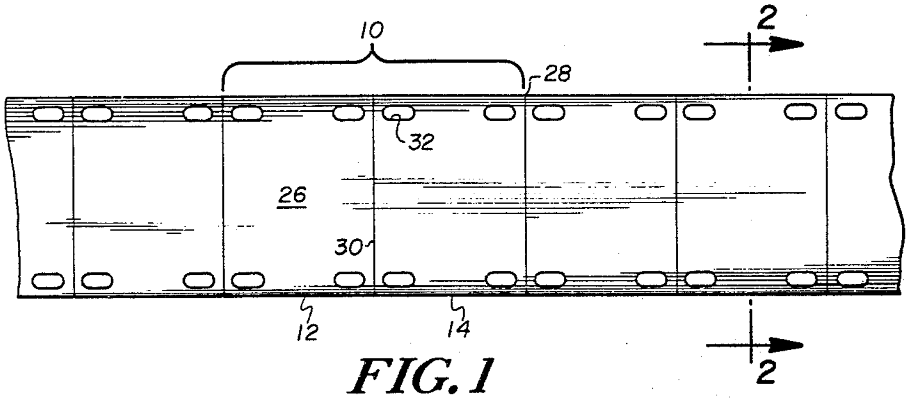
FIG. 1 illustrates a portion of a web of identification tags constructed in accordance with a first embodiment of the invention.
Figure 2:
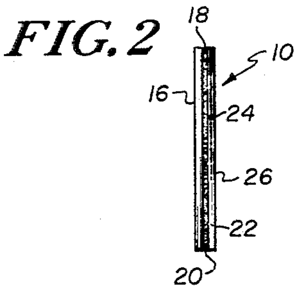
FIG. 2 is a section of the identification tags of FIG. 1 taken along the lines 2—2.
Figure 3:
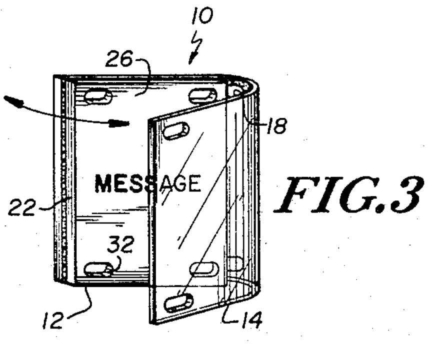
FIG. 3 is an isometric view of the assembly of the identification tag as shown in FIG. 1.

Turning now to FIGS. 1 and 2 there is shown an identification tag 10 constructed in accordance with the concepts of the invention. Identification tag 10 consists of a left portion 12 and a right portion 14. Portions 12 and 14 are similar in construction and may be alternatively used; that is to say, in any particular application either the left or the right hand sides 12 or 14, respectively, may be used for receiving indicia upon the writing surfaces as will be described below. Tag 10 is constructed of a transparent base layer 16, which may be of Mylar or similar material which is relatively abrasive resistant and which will readily resist the surrounding environment. The first face 18 of the base layer 16 is roughened by polishing or the like to provide for the receipt of a transparent, pressure sensitive, nondistorting adhesive layer 20 to be applied directly thereon. In addition, the roughening of the face 18 of the layer 16 also permits the application of indicia by means of manual writing devices such as pen or pencil. If not for the roughening the face 18 of the base layer 16, indicia placed by pen and pencil upon the smooth surface of the base layer 16 could otherwise be easily removed by rubbing or contact with the other objects. Placed atop the adhesive layer 20 is a layer 22 having on its surface 24 a release-coating and at its surface 26 a smooth surface for the receipt thereon of indicia written either by manual or automatic means. Individual tags 10 separated from adjacent tags 10 on the web by means of score lines 28 which extend through the layer 22 the adhesive layer 20 into the base layer 16, to weaken it so that it may be easily separated. The two component portions, 12 and 14, of individual tags 10 are scored by score lines 30 which extend merely through the layer 22 and the adhesive layer 20 but do not enter the base layer 16. However, in those instances where it is desired to use a very thick base layer 16 some scoring of the lines 30, into the base layer 16, may be preferable to permit greater ease in bending the base layer 16 as will be described in reference to FIG. 3. At predetermined intervals along the length of the tag 10 there are placed mounting holes 32. These holes are so arranged that when the left or right portions 12 and 14, respectively, are bent one over the other, the mounting holes 32 of both portions will be aligned.

In employing the identification tag 10 of FIGS. 1 and 2 indicia is placed upon the indicial receiving surface 26 of the layer 22, for example the left hand portion 12. The indicia may be applied by manual means, such as pen or pencil, or by automatic means such as a stamping machine, typewriter or the like. Once this has been done the layer 22 is removed from the right hand portion 14, and the right hand portion 14 is folded over the left hand portion 12. The adhesive layer 20, on the right hand portion 14, is now pressed into engagement with the indicia receiving surface 26 of the layer 22 with care taken to align the mounting slots 32 of the right hand portion 14 with the mounting slots 32 on the left hand portion 12. Bundling straps, or the like, may now be passed through the mounting slots 32 either in a vertical or a horizontal direction, depending upon the particular tag location. Tightening of the mounting straps increases the pressure applied to the components of the identification tag 10 assuring a tight fit of the respective components.

Figures 4, 5:
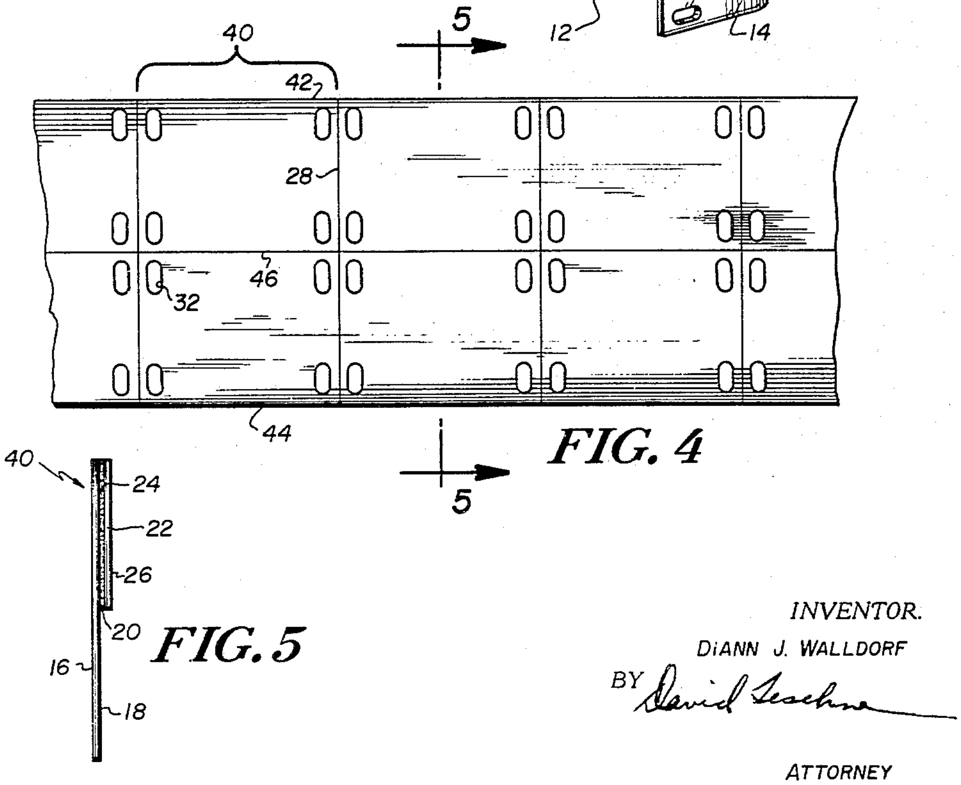
FIG. 4 shows an alternative construction of the identification tag constructed in accordance with the concepts of the invention.
FIG. 5 is a section of the identification tag, as shown in FIG. 4, taken along the line 5—5.

Turning now to FIGS. 4 and 5 a modification of the identification tag as shown in FIGS. 1 and 2 is illustrated Identification tag 40 has an upper portion 42 and a lower portion 44. The upper portion 42 is the same in all respects with the left or right hand portions 12 or 14 respectively of FIG. 1. Lower portion 44 has the adhesive layer 20 and the indicia receiving layer 22 omitted therefrom. Score lines 28 separate individual identification tags 40 from their adjacent tags and a score line 46 is placed along a line about which the upper portion 42 and lower portion 44 may be folded in order to seal the tag 40. To use this embodiment of the identification tag, indicia is placed upon the exposed roughened face 18 of the lower tag portion 44. The layer 22 is then removed from the upper portion 42 and folded over so that the indicia will be protected and sealed with the identification tag. In this way the requirement for a separate indicia receiving layer, such as 22, is completely eliminated. The mounting slots 32, of the upper and lower portions 42 and 44, are similarly aligned prior to the time that the tag portions are joined and a mounting strap, or the like, is passed therethrough in order to mount the identification tag 40 either horizontally or vertically with respect to the article to be identified.

Thus there has been described an identification tag which may be sealed to protect indicia contained therein without the use of ancillary equipment and which requires no operators skill to insure the integrity of the sealed form. Common writing devices, both manual devices, such as pen or pencil or automatic devices such as typewriters may be employed using the identification tag either in individual or web form. The indicia, once the identification tag has been sealed, is protected from its environment and from abrasion and is tamper proof in that the indicia may not be removed without tag destruction. Additionally, since the identification tag does not include, but merely provides for attaching straps, the identification tag may be used with a wide variety of article sizes and does not require separate identification tags to be employed with each different object size. Additionally, the base material, or the indicia receiving material, may be color coded for easy identification of particular characteristics of the articles to be identified.

While there have been shown and described and pointed out the fundamental novel features of the invention as applied to the preferred embodiment, it will be understood that various omissions and substitutions and changes of the form and details of the devices illustrated and in their operation may be made by those skilled in the art, without departing from the spirit of the invention.

The embodiments of the invention in which an exclusive property or privilege is claimed are defined as follows:

1. An identification tag comprising a first transparent layer having one face thereof roughened; a transparent adhesive layer placed on at least one portion of the roughened face of said first layer, causing said first layer to be partitioned into two distinct portions; a release layer placed atop said adhesive layer covering at least one portion of said first layer; a writing layer placed atop said release layer and a plurality of mounting slots through said tag, positioned to be aligned in complementary pairs when a first portion of said first layer is folded and positioned over the second portion of said first layer, said tag being joined by said adhesive layer when said release layer and writing layer are removed.

2. An identification tag as defined in claim 1, wherein said release layer and said writing layer are unitary.

3. An identification tag as defined in claim 1, wherein said transparent adhesive layer extends over the entire roughened face of said first layer; said release layer extends over the entire adhesive layer and said writing layer extends over the entire release layer; said writing layer and said release layer being slit to permit the selective removal of a portion of said release and writing layers exposing said adhesive layer thereunder; whereby upon the removal of a portion of said release and writing layers said tag may be folded along the slit to provide a protective cover for indicia placed on the remaining writing layer.

4. An identification tag as defined in claim 3, wherein said release layer and said writing layer are unitary.

5. An identification tag as defined in claim 1, fabricated in a continuous web whereby desired lengths of said tag may be selectively cut from said web.

6. An identification tag as defined in claim 1, further including straps proportioned to pass through said mounting slots whereby said identification tag may be fastened to articles to be identified.

7. An identification tag as defined in claim 1, wherein said first transparent layer is scored to permit a first portion of said first layer to be positioned adjacent a second portion of said first layer; said release and writing layers being removable to expose said adhesive layer whereby said first and second portions of said first layer may be folded about said score line to protect indicia placed upon the roughened face of said first layer.

8. An identification tag as defined in claim 7, wherein said release and writing layers are unitary.

9. An identification tag as defined in claim 8, further including straps proportioned to pass through said mounting slots whereby said identification tag may be fastened to articles to be identified.

References Cited

UNITED STATES PATENTS

| | | | |
|---|---|---|---|
| 2,671,678 | 3/1954 | Walsh | 40—2 X |
| 3,054,202 | 9/1962 | Scholfield | 40—2 X |
| 3,228,129 | 1/1966 | Gwinn et al. | 40—2 X |
| 3,269,041 | 8/1966 | Marcus | 40—10 |
| 3,069,793 | 12/1962 | Francescon | 40—2.2 |

EUGENE R. CAPOZIO, Primary Examiner

W. J. CONTRERAS, Assistant Examiner

U.S. Cl. X.R.

40—20